Patented Jan. 21, 1930

1,744,149

UNITED STATES PATENT OFFICE

OTTO STAEHLIN, OF HOCHST-ON-THE-MAIN, GERMANY, ASSIGNOR TO GENERAL ANILINE WORKS, INC., OF NEW YORK, N. Y., A CORPORATION OF DELAWARE

STABLE DIAZO-SALT PREPARATION AND PROCESS OF PREPARING IT

No Drawing. Application filed July 23, 1927, Serial No. 208,057, and in Germany August 2, 1926.

United States patent application Ser. No. 74,161 filed December 8, 1925, describes the manufacture of stable diazo-preparations by mixing diazo-compounds with metal salts of arylsulfonic acids whereby, even when sparingly soluble diazo-salts are used, more readily soluble preparations are obtained.

Now the acid 1.5-naphthalenedisulfonates of certain diazonium bases have more or less the tendency of being transformed into their neutral, more difficultly soluble salts. As has also been disclosed in United States patent application Ser. No. 77,576 filed December 24, 1925, they are, when dissolved in water, partly split up into the neutral salt and into free naphthalenedisulfonic acid. This is the case to a particularly great extent with the 1.5-naphthalenedisulfonates of the diazotized nitroanilines. Even if the solubility of the preparations obtained from the compounds in question is improved by the addition of the above-named metal salts of readily soluble arylsulfonic acids, it is not sufficient for all technical purposes.

According to the present invention this disadvantage is obviated by the addition of a free arylsulfonic acid to the preparations. Thus, the splitting up of the acid diazo salts is restrained and preparations are obtained which are still more readily soluble than are the preparations obtainable by the addition of metal salts of the arylsulfonic acids, and are at the same time very stable.

The following examples serve to illustrate my invention, but they are not intended to limit it thereto; the parts are by weight:

(1) A mixture of 10 parts of acid- and 1 part of neutral-naphthalenedisulfonate of diazotized ortho-nitraniline, which is extremely sparingly soluble in water, is intimately mixed with 5 parts of 1.5-naphthalenedisulfonic acid and 0.5 part of sodium benzylnaphthalenesulfonate. The mixture thus obtained is readily soluble in water to a clear solution.

(2) A mixture of 10 parts of acid- and 1 part of neutral-1.5-naphthalenedisulfonate of diazotized paranitraniline, which does not dissolve to a solution of 2 per cent strength, is initimately mixed with 3 parts of 1.5-naphthalenedisulfonic acid. The mixture so prepared is easily soluble in water to a clear solution.

Instead of the 1.5-naphthalenedisulfonic acid there may be used with a similar result any other non-hygroscopic sulfonic acid, for instance para-toluenesulfonic acid.

In practice there can, of course, conveniently be used only such free arylsulfonic acids as are not hygroscopic or even diliquescent.

I claim:

1. The process of preparing stable diazo-salt preparations by adding to salts of a diazo-compound a free arylsulfonic acid as a stabilizing agent.

2. The process of preparing stable diazo-salt preparations by adding to salts of a diazo-compound a free arylsulfonic acid, mixed with a readily-soluble salt of an arylsulphonic acid, as a stabilizing agent.

3. As new products, stable diazo-salt preparations consisting of a mixture of a salt of a diazo-compound and a free arylsulfonic acid.

4. As new products, stable diazo-salt preparations consisting of a mixture of a salt of a diazo-compound, a free arylsulfonic acid and a readily-soluble salt of an arylsulphonic acid.

5. The process of preparing stable diazo-salt preparations by adding to salts of a diazo-compound 1.5-naphthalenedisulfonic acid as a stabilizing agent.

6. The process of preparing stable diazo-salt preparations by adding to salts of a diazo-compound 1.5-naphthalenedisulfonic acid mixed with sodium benzylnaphthalenesulfonate as a stabilizing agent.

7. The process of preparing stable diazo-salt preparations by adding to the naphthalenedisulfonate of a diazo-compound 1.5-naphthalenedisulfonic acid as a stabilizing agent.

8. The process of preparing stable diazo-salt preparations by adding to the naphthalenedisulfonate of a diazo-compound 1.5-naphthalenedisulfonic acid mixed with sodium benzylnaphthalenesulfonate as a stabilizing agent.

9. The process of preparing stable diazo-salt preparations by adding to the 1.5-naphthalenedisulfonate of the diazo-compound of o-nitranilin 1.5-naphthalenedisulfonic acid as a stabilizing agent.

10. The process of preparing stable diazo-salt preparations by adding to the 1.5-naphthalenedisulfonate of the diazo-compound of o-nitranilin, 1.5-naphthalenedisulfonic acid mixed with sodium benzylnaphthalenesulfonate as a stabilizing agent.

11. As new products stable diazo-salt preparations consisting of a mixture of a salt of a diazo-compound and 1.5-naphthalenedisulfonic acid.

12. As new products stable diazo-salt preparations consisting of a mixture of a salt of a diazo-compound, 1.5-naphthalenedisulfonic acid and sodium benzylnaphthalenesulfonate.

13. As new products stable diazo-salt preparations consisting of a mixture of a naphthalenedisulfonate of a diazo-compound and 1.5-naphthalenedisulfonic acid.

14. As new products stable diazo-salt preparations consisting of a mixture of a naphthalenedisulfonate of a diazo-compound, 1.5-naphthalenedisulfonic acid and sodium benzylnaphthalenesulfonate.

15. As a new product the stable diazo-salt preparation consisting of a mixture of the 1.5-naphthalenedisulfonate of the diazo-compound of o-nitranilin and 1.5-naphthalenedisulfonic acid.

16. As a new product the stable diazo-salt preparation consisting of a mixture of the 1.5-naphthalenedisulfonate of the diazo-compound of o-nitranilin, 1.5-naphthalenedisulfonic acid and sodium benzylnaphthalenesulfonate.

In testimony whereof, I affix my signature.

OTTO STAEHLIN.